US009001511B2

(12) United States Patent
Gobeil (10) Patent No.: US 9,001,511 B2
(45) Date of Patent: Apr. 7, 2015

(54) PORTABLE DOCKING STATION FOR PORTABLE ELECTRONIC DEVICE (71) Applicant: QNX Software Systems Limited, Kanata (CA)

(72) Inventor: Charles Marc Gobeil, Ottawa (CA)

(73) Assignee: 2236008 Ontario Inc., Waterloo, Ontario (CA)

( * ) Notice: Subject to any disclaimer, the term of this patent is extended or adjusted under 35 U.S.C. 154(b) by 209 days.

(21) Appl. No.: 13/656,109

(22) Filed: Oct. 19, 2012

(65) Prior Publication Data
US 2014/0111912 A1    Apr. 24, 2014

(51) Int. Cl.
G06F 1/16    (2006.01)

(52) U.S. Cl.
CPC ............ *G06F 1/1626* (2013.01); *G06F 1/1632* (2013.01)

(58) Field of Classification Search
CPC ........................................................ G06F 1/16
USPC ......... 248/27.1, 229.12, 316.7, 316.4, 176.3, 248/157, 346.01; 361/679.01, 679.02, 361/679.03, 679.59, 679.43, 679.41, 361/679.26, 679.27, 679.28, 679.29, 361/679.06, 679.55; 345/633, 173, 179, 345/204, 1.1, 156, 161; 206/588, 233, 37, 206/315.11, 216, 315.1; 455/418, 517, 455/435.3, 127.4, 127.1, 310, 412.1; 16/430, 422, 114.4
See application file for complete search history.

(56) References Cited

U.S. PATENT DOCUMENTS

| 5,644,471 | A | 7/1997 | Schultz |
| 6,937,468 | B2 | 8/2005 | Lin |
| 6,988,910 | B2 | 1/2006 | Gartrell |
| 8,576,564 | B2 * | 11/2013 | Murakata et al. ........ 361/679.59 |
| 2005/0111182 | A1 | 5/2005 | Lin |
| 2007/0053680 | A1 | 3/2007 | Fromm |
| 2010/0250815 | A1 | 9/2010 | Street |
| 2012/0075799 | A1 | 3/2012 | Pollex |
| 2012/0104185 | A1* | 5/2012 | Carroll ......................... 248/27.1 |
| 2012/0194994 | A1 | 8/2012 | Lloyd |
| 2012/0224321 | A1 | 9/2012 | Carnevali |
| 2012/0297575 | A1 | 11/2012 | Garcia |
| 2014/0111912 | A1* | 4/2014 | Gobeil ..................... 361/679.01 |

FOREIGN PATENT DOCUMENTS

WO    2012139198    10/2012

OTHER PUBLICATIONS

Anastassiades, G. , Extended European Search Report for EP 12189215.2, Mar. 15, 2013.
Camera Extension and Support Accessory, www.ip.com—Prior Art Database, IPCOM000219803D, Jul. 16, 2012, 5 pages.

* cited by examiner

*Primary Examiner* — Hung Duong
(74) *Attorney, Agent, or Firm* — Integral Intellectual Property Inc.; Miriam Paton (57) ABSTRACT

The present disclosure is generally directed to a portable docking station having a frame, a handle and a counterweight, that receives a portable electronic device. The portable docking station may include one or more physical features that enable the portable docking station to be held in the hand or hands of a user, and for the portable electronic device to be used while docked.

13 Claims, 8 Drawing Sheets

PORTABLE DOCKING STATION FOR PORTABLE ELECTRONIC DEVICE

FIELD

The present disclosure relates generally to devices for housing or mounting or docking portable electronic devices, and may include portable docking stations that may be electrically or optically connected or otherwise communicatively connected to the portable electronic device.

BACKGROUND

Some portable electronic devices, such as tablet computers, can be used while being held in a human hand, or while resting on a surface such as a table or desk. The manner of usage may vary depending upon whether such a surface is available to a user or not. If a user is, for example, sitting in a waiting room and holding the portable electronic device with one hand, it may be that the hand holding the device is not free to type or touch the screen or otherwise use the device. In some situations, holding using a portable electronic device with one hand while interacting with the portable electronic device with the other hand may make use more difficult; a user may find practical difficulties holding both the portable electronic device and a separate physical keyboard or other accessory, for example. Further, holding the portable electronic device with a hand can result in some instability in the positioning of the portable electronic device. The portable electronic device may have a tendency to twist, for example, when touched or otherwise interacted with by the user's free hand. Some users may also find it uncomfortable or cramped to hold some kinds of portable electronic devices.

BRIEF DESCRIPTION OF THE DRAWINGS

Embodiments of the present disclosure will now be described, by way of example only, with reference to the attached figures.

DETAILED DESCRIPTION

The present disclosure describes a portable docking station that receives a portable electronic device. The portable docking station and portable electronic device are portable in the sense that they are readily movable from place to place, and may be handheld. The portable docking station includes one or more physical features that enable the portable docking station to be held in the hand or hands of a user and for the portable electronic device to be used while docked in the portable docking station. Various embodiments of the portable docking station may include one or more optional features that can enhance the functionality of the portable electronic device or make the portable electronic device easier or more comfortable or more convenient to use.

In this disclosure, some terms, such as "handle," may be used in the singular or the plural. The use of singular is generally not intended to convey the intent that there is one and only one element. Similarly, use of the plural is not generally intended to convey that there necessarily are two or more elements.

Also, in this disclosure, elements may be described as "configured to" perform one or more functions. In general, an element that is configured to perform a function is suitable for performing the function, or is adapted to perform the function or is otherwise capable of performing the function. The function or the capability of performing the function need not be required in all embodiments. In addition, the capability of performing a function does not necessarily indicate that the function is being performed all the time. For example, an element that may be configured to communicate wirelessly with another element, but the elements need not be constantly communicating wirelessly.

Further, in this disclosure, the term coupled may be employed in many contexts. In general, components that are "communicatively coupled" are configured to communicate (that is, they are capable of communicating) in any fashion for any duration, such as by way of electric signals, optical signals, wireless signals, or any combination thereof. The communication may be one-way or two-way communication. Components are "physically coupled" when they are attached or connected or joined to one another, in any fashion, whether releasably or substantially permanently, so that physical activity of one component generally affects the other. The physical attachment may be direct or by way of one or more intermediate elements. According to context, two components that are physically coupled may behave as a single element. In some cases, physically coupled elements may be integrally formed, e.g., part of a single-piece article that may share structures and materials. In other cases, physically coupled elements may comprise discrete components that may be fastened together in any fashion. Physical coupling may also include a combination of discrete components fastened together, and components fashioned as a single piece.

Figure 1:
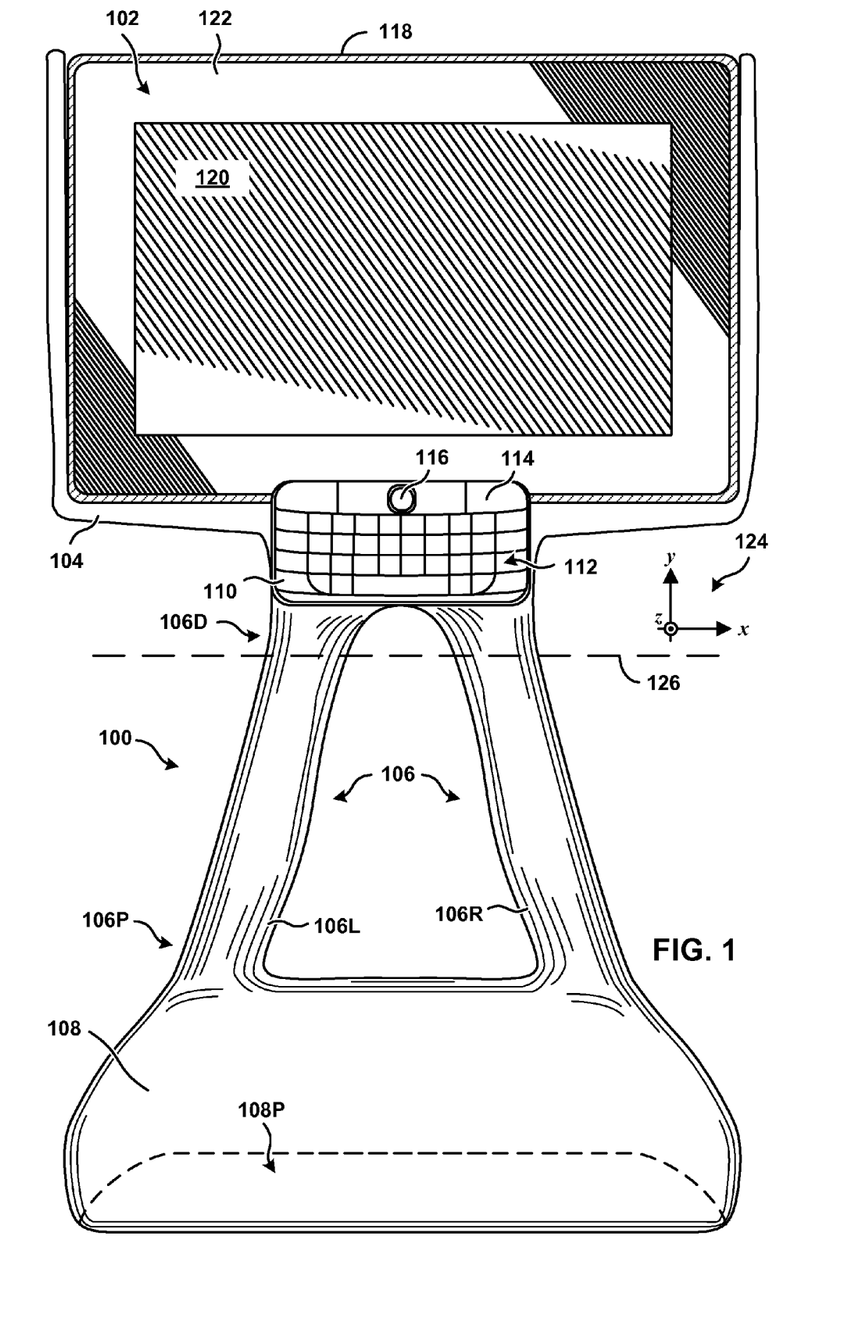
FIG. 1 is a plan view of an illustrative embodiment of a portable docking station, with in illustrative portable electronic device docked in the portable docking station.

FIG. 1 is a plan view of an illustrative portable docking station 100, with an illustrative portable electronic device 102 docked with the portable docking station 100. As used in this disclosure, the portable electronic device 102 is "docked" with the portable docking station 100 when the portable electronic device 102 is received in, physically coupled to, secured in or otherwise held by the portable docking station 100. As will be described below, the portable electronic device 102 may be releasably held by the portable docking station 100, and may be undocked as well as docked.

The portable docking station 100 comprises a frame 104, which receives the portable electronic device 102, one or more elongated handles 106, which are physically coupled to the frame 104 and which extend away from the frame 104, and a counterweight 108, which is physically coupled to at least one of the handles 106. In the embodiment depicted in FIG. 1, the portable docking station 100 includes two handles:

a left handle 106L and a right handle 106R. Any number of handles 106 may be physically coupled to the frame 104, but inclusion of two handles 106L and 106R may offer benefits of ease of holding the portable docking station 100 with two hands.

As will be discussed below, in typical usage the counterweight 108 may be physically closer to the user than the frame 104. Accordingly, the handle (or handles) 106 may be described as having a proximal end 106P (that is, an end that in typical usage is closer to the user), which is physically coupled to the counterweight 108, and a distal end 106D (which in typical usage is farther from the user), which is physically coupled to the frame 104. Further, the counterweight 108 includes a proximal region (or surface) 108P, which in ordinary use may be physically closer to the user and may actually be in physical contact with the body of the user. The proximal region 108P indicated in broken lines in FIG. 1 is not intended to be define an area of any specific dimensions, nor does the proximal region 108P necessarily define any structure distinct from the rest of the counterweight 108. In some embodiments, there need not be distinct outward structure that distinguishes the handle 106 from the counterweight 108. For example, the proximal end of the handle 106 may include substantially more mass than the distal end of the handle 106, such that the counterweight 108 and the distal end of the handle 106 may seem to a user to be a single structure, with no distinct visible counterweight 108.

Proximate to the site where the handles 106 are physically coupled to the frame 104, an input device 110 may be mounted. The input device 110 may be removable. That is, the input device 110 may be mounted to an input device interface (not shown in FIG. 1), and may be mounted or removed by a user with or without a need for tools. Once mounted, the input device 110 generally behaves as a component of the portable docking station 100, and may be touched, depressed or otherwise activated in normal usage without dislodging the input device 110 from its interface. As will be discussed below, the input device 110 may be configured to be communicatively coupled to the portable electronic device 102. The communication between the input device 110 and the portable electronic device 102 may be, for example, optical over optical channels, or electronic over conductors or wireless (such as by radio or induction), or any combination thereof. The communication may be one-way or two-way communication. The communication may be direct (e.g., via a wireless channel between the input device 110 and the portable electronic device 102) or through one or more intermediate elements (e.g., via one or more wired or conductive paths in the portable docking station 100). The input device 110 may be strictly an input-only device; in some embodiments, however, the input device 110 may be an input-output device and may include one or more output elements, such as an indicator lamp.

As illustrated in FIG. 1, the input device 110 includes a keypad 112, such as a full or abbreviated (or reduced) set of alphanumeric keys, one or more buttons or function keys 114 and a touch pad 116. The particular forms or manners of input may be of any kind and in any combination. When the input device 110 is game controller, for example, the input device 110G (shown in FIG. 3) may include one or more joysticks, directional buttons, indicator lamps, vibrators, levers and the like. In various embodiments, the input device may include a touch screen, a track ball, a track wheel, or other pointing device, for example. In some embodiments, the input device 110 may be a device that can operate independently of the other components of the portable docking station 100. For example, the input device 110 may be an independently operable portable electronic device such as a smart phone or a portable media player, for example; such an input device 110 may operate as a smart phone or media player when not mounted to other components of the portable docking station 100 or when not communicatively coupled to the portable electronic device 102.

As depicted in FIG. 1, the input device 110 includes a full alphanumeric keyboard 112 but the keyboard 112 is smaller than a typical keyboard that may be found with a desktop computer, laptop computer or tablet computer. Although the concept described herein may be used with a keyboard 112 of any physical dimensions, the miniature keyboard 112 depicted in FIG. 1 may be desirable for users who prefer to type with their thumbs. The keyboard 112 may be a physical keyboard (that is, a set of individually depressible keys or buttons) or a virtual keyboard (that is, a visual representation of a keyboard, typically on a touch screen, that responds to touch or finger placement), or a combination of physical and virtual. Some users prefer a physical keyboard to a virtual keyboard for reasons such as ease of touch typing, reduced risk of an unintended key activation, or the tactile and auditory sensations that may be absent in or poorly simulated by a virtual keyboard. As will be described below, a two-handled embodiment of the portable docking station 100 may support thumb-typing, as well as other thumb-based inputs such as thumb activation of a game controller. The keyboard 112 depicted in FIG. 1 can be a physical alphanumeric keyboard with thumb-sized keys (or thumb keyboard).

The portable electronic device 102 depicted in FIG. 1 is a tablet computer. The concept described herein is not limited to a tablet computer, and may include a portable electronic device such as a smart phone, video monitor, game display, navigation device (such as a global positioning system (GPS) device), music or media player, electronic book device (or e-reader) and the like. The portable electronic device 102 may be handheld, that is, sized and shaped to be held or carried in a human hand, and typically used while so held. A user may dock the portable electronic device 102 in the portable docking station 100 as described in more detail below, and may further select an input device 110 to operate in concert with the docked portable electronic device 102. For example, if the docked portable electronic device 102 is a tablet computer, the input device 110 may be a keyboard, but if the docked portable electronic device 102 is a game display, the input device 110 may be a game controller.

In the illustrative embodiment shown in FIG. 1, the docked portable electronic device 102, a tablet computer, includes an exterior perimeter 118, which may give the portable electronic device 102 some structural integrity. The illustrative portable electronic device 102 is substantially planar, that is, substantially more extensive in the x- and y-directions (with reference to the coordinate system 124 in FIG. 1) than in the z-direction. The docked portable electronic device 102 includes a display screen 120, which may be a touch screen display (that is, a display screen that may supply visual output—such as but not limited to a virtual keyboard—and receive tactile input by way of user touches, taps, gestures, stylus contact and the like). In the embodiment depicted in FIG. 1, the docked portable electronic device 102 includes an inactive area 122 (which may, for example, be excluded from supplying visual output or receiving tactile input). In some embodiments, the inactive area 122 may be called a bezel. In some embodiments, the inactive area 122 may include one or more devices, such as input or output devices, such as a camera, light sensor, microphone, speaker or touch pad. In some embodiments, the exterior perimeter 118 may include one or more sensors, buttons, microphones, speakers, and the like. The portable docking station 100 may be capable of cooperating with a wide variety of portable electronic devices 102, including portable electronic devices that lack an inactive area 122.

The portable electronic device 102 may be docked in the portable docking station 100 by being received in and held securely in the frame 104. In one embodiment, the frame 104 may be sized and shaped to receive a particular portable electronic device 102, or a portable electronic device 102 having particular dimensions. In another embodiment, the frame 104 may be adjustable or adaptable to receive a variety of portable electronic devices 102 having a variety of dimensions. The frame 104 may be adjustable to receive portable electronic devices 102 of different dimensions through pins, locking features, sliding components, elastic components and telescoping components, for example. The frame 104 may resemble, for example, a fork or a tray or a clamp.

The frame 104 may be constructed from any material or combination of materials, such as plastic, metal, silicone, rubber, elastic or ceramic. Materials may be selected in consideration of factors such as durability, robustness, structural integrity, weight, electrical conductive or insulative properties, cosmetic appearance, texture, and the like. As depicted in FIG. 1, the frame 104 engages three of the four edges of the exterior perimeter 118 of the portable electronic device 102, but this is just for purposes of illustration. The frame may contact almost any part of the portable electronic device 102 (although it is desirable that the display screen 120 be generally unimpeded by the frame 104). The frame 104 may, for example, engage or support or otherwise be in contact with the reverse side of the portable electronic device 102, that is, the side of the portable electronic device 102 opposite the side having the display screen 120.

The portable electronic device 102 may be secured in the frame 104 in any of several ways, such as by a friction fit or with the aid of fasteners or securing features such as straps, bands, hasps, magnets, latches, and the like. The frame 104 may include padding or a non-slip surface that may assist in protecting the portable electronic device 102 from scratches or that may assist in holding the portable electronic device 102 in the frame 104. In some variations, the frame 104 may include a display cover (which may be but need not be wholly or partly transparent) that covers part or all of the display screen 120. Such an optional display cover (not shown) may protect the display screen 120 from contaminants, for example, or may operate as a privacy filter. Typically, securing the portable electronic device 102 in the frame 104 may be an operation that can be performed by a user without a need for tools. Once secured, the portable electronic device 102 would ordinarily not be dislodged or separated from the frame 104 by ordinary use (such as touching the display screen 120) or by conventional disturbances such as accidental jostling. The user may, however, be able readily to undock or remove the portable electronic device 102 from the frame, typically without a need for tools. That is, the frame 104 is configured releasably to hold the portable electronic device 102, enabling the user to dock and undock the portable electronic device 102. Securing the portable electronic device 102 in the frame 104 may include electrically or optically engaging one or more physical connectors, as will be described below.

Figure 2:
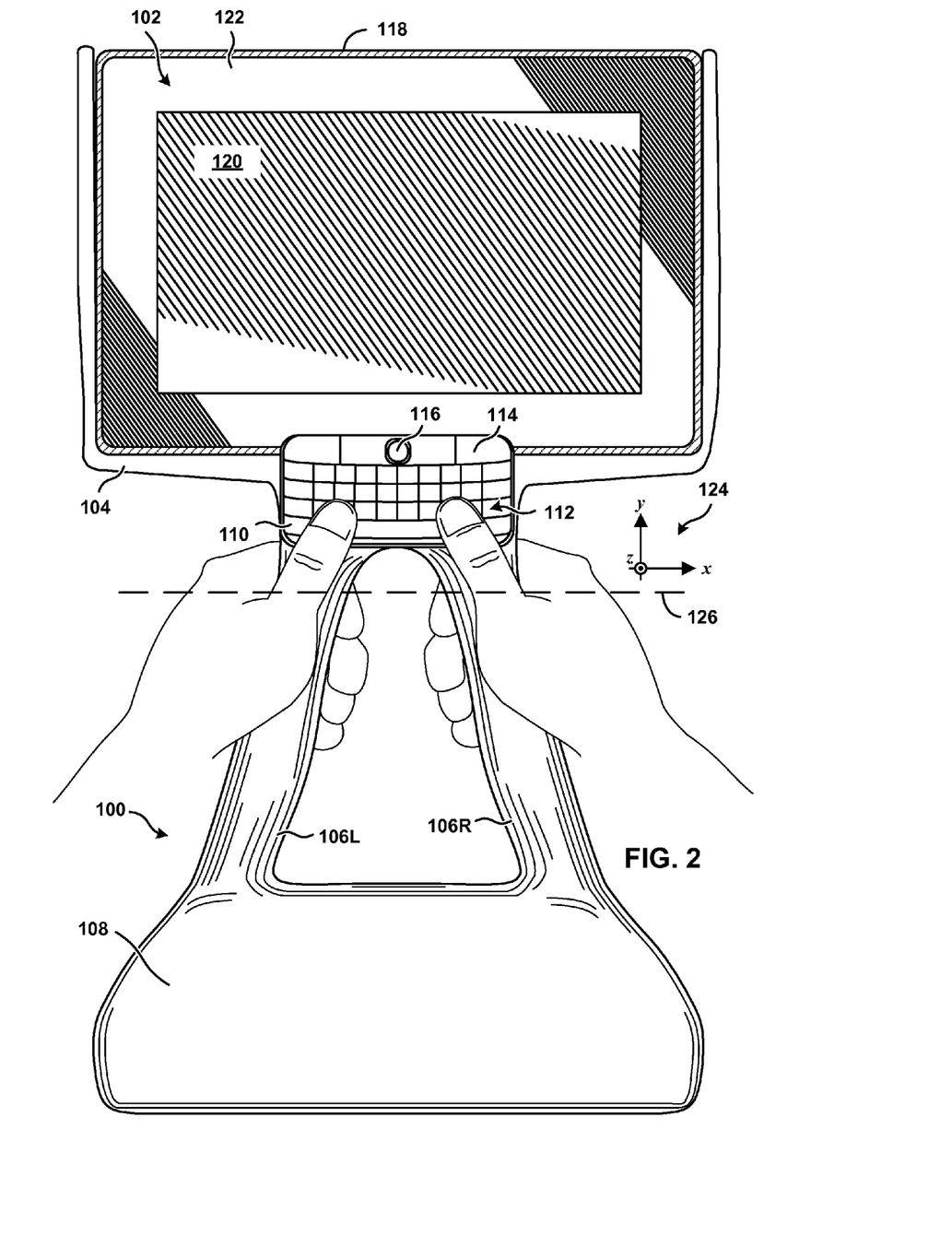
FIG. 2 is a plan view of the embodiment of the portable docking station depicted in FIG. 1, further showing a typical placement of a user's hands.

When the portable electronic device 102 is secured in the frame 104, the portable electronic device 102 and the portable docking station 100 may behave as a single apparatus assembly. The mass of the portable docking station 100 and the mass of the docked portable electronic device 102 may create an axis of balance 126. The axis of balance 126, which may be substantially oriented in the x-direction and which may be adjustable by a user (e.g., by setting or adjusting the length or orientation of the handles 106 or by setting or adjusting the mass of the counterweight 108), may generally pass through the handles 106 proximate to the input device 110. When a user's hands support the handles 106, as illustrated in FIG. 2, the user's hands may support the portable docking station 100 and the secured portable electronic device 102. The weight of the portable docking station 100 with the docked portable electronic device 102 may be evenly distributed over both hands.

The handles 106 may be ergonomically designed for fit and comfort. Although generally elongated, the handles 106 may be substantially straight in places or curved in places. The handles 106 may be foldable, extendable, contractible, bendable or otherwise user-adjustable. The handles 106 may be substantially cylindrical, but as shown in the figures, the handles 106 may vary in thickness or roundness or flatness or otherwise may have a comfortable or otherwise useful contour. Ergonomically shaped handles may not only improve fit and comfort (especially in comparison to holding the portable electronic device 102 itself, which might not be formed ergonomically for fit and comfort with the human hands), they may help resist twisting if the user holds a handle 106 with one hand and touches the display screen 120 with the other hand.

The handles 106 may be constructed from any material or combination of materials, such as those mentioned previously with respect to the frame 104. The handles 106 may be formed as a unitary structure with the frame 104, or may be attached to the frame 104 in any fashion. In one embodiment, the handles 106 may be attached to the frame 104 with an adjustable attaching mechanism (discussed below), such that the frame 104 (and the portable electronic device 102 docked in the frame 104) can be user-oriented with respect to the handles 106, or so that the frame 104 can be bent or folded with respect to the handles 106 to make the portable docking station 100 more compact. In some embodiments, the frame 104 may be configured to be physically disconnected from the handles 106. The handles 106 may be padded or include a non-slip surface. In one variation, one or more handles 106 may include a tether (not shown) that may encircle a user's wrist (for example) and reduce the risk of dropping the apparatus. In another variation, a tether may supplement or supplant the resistance to twisting supplied by the counterweight 108. In another variation, the handles 106 may include finger grooves, finger or hand holes, or other physical features that may aid a user's grip. In a further variation, one or more handles 106 may include one or more buttons, levers, force sensors, orientation sensors or other control or sensing elements. Such control elements may be placed on and project from, for example, the underside of the handles 106 (e.g., substantially in the negative z-direction), so that the control elements can be activated with the fingers or by changing the grip on one or more handles 106. Such control elements may resemble control elements that may be present on the handgrips of some handheld game controllers. In still a further variation, the handles 106 may include user-replaceable handgrips. Many of these variations may be used in concert.

The construction and location of the counterweight 108 with respect to the portable electronic device 102, as well as the manner in which the portable docking station 100 may be typically used (as illustrated below), may make the portable docking station 100 more resistant to twisting or rotational forces that may be expected to occur during normal use. A user using the input device 110 with thumbs, as depicted in FIG. 2, is less apt to cause the portable docking station 100 to twist. Further, if the user chooses to touch the display screen 120, the surface of the display screen 120 is more likely to be stable and less likely to turn or otherwise move away in response to the touch. Factors contributing to the resistance to twisting may include the user's grip on a handle 106, balance created by the counterweight 108 and contact between the user's body and the counterweight 108.

The counterweight 108 functions in part as a stabilizer and may also function as a support. As will be described below, a user may rest the counterweight 108 on the user's lap (for example), thereby bringing the portable electronic device 102 and input device 110 into one or more positions that are more comfortable or otherwise desirable for the user. The counterweight 108 may be padded (or cushioned). In some embodiments, the padding may be located on the proximal region 108P, which is most likely to be in physical contact with the body of the user. In addition or in the alternative, the counterweight 108 may include a non-slip surface (or material) that may resist slipping when the counterweight 108 in contact with a body of a user. In some embodiments, the non-slip surface may be applied to or otherwise included on the proximal region 108P, and omitted elsewhere on the counterweight 108. The counterweight 108 may be constructed from any material or combination of materials, such as those mentioned previously, and may be formed as a unitary structure with one or more handles 106 or may be attached to the handle 106 in any fashion. In some embodiments, the counterweight may be foldable with respect to or detachable from the handles 106.

The mass of the counterweight 108 may be any mass. The counterweight 108 may, but need not, have a mass comparable to that of the portable electronic device 102. Some portable electronic tablet devices may have masses in the range of 400 grams to one kilogram but some portable electronic devices may have a greater mass and some less. The amount of mass in the counterweight 108, or the location of the mass, may be user-adjustable, and may be selected or adjusted for balance, stability, total weight, or other user preference.

The counterweight 108 may include (but not necessarily consist entirely of) "dead weight," that is, a mass without any other particular functionality, such as an encased lump of metal or a container of sand. In some embodiments, the counterweight 108 may be consisting of dead weight, that is, the counterweight may have no components of particular functionality. In other embodiments, however, the counterweight may include one or more functional components that, in addition to supplying mass, offer additional functionality.

For example, in one embodiment, the counterweight 108 may house a portable power supply. The power supply may include, but is not limited to, a rechargeable battery. Such a portable power supply may be used to supply power to the portable electronic device 102, enabling the portable electronic device 102 to be powered and to operate for a longer time. In another embodiment, the counterweight 108 may include a storage compartment, capable of holding power or recharger cords, for example, or game cartridges or memory modules or headphones or other accessories or another input device 110. In still a further embodiment, the counterweight 108 may include an electronic device or component, such as a camera, processor, antenna, wireless transceiver, game feedback element (such as a vibrator or other haptic feedback element), microphone or speaker. In still a further embodiment, the counterweight 108 may include a combination of functional components and dead weight.

Figure 3:
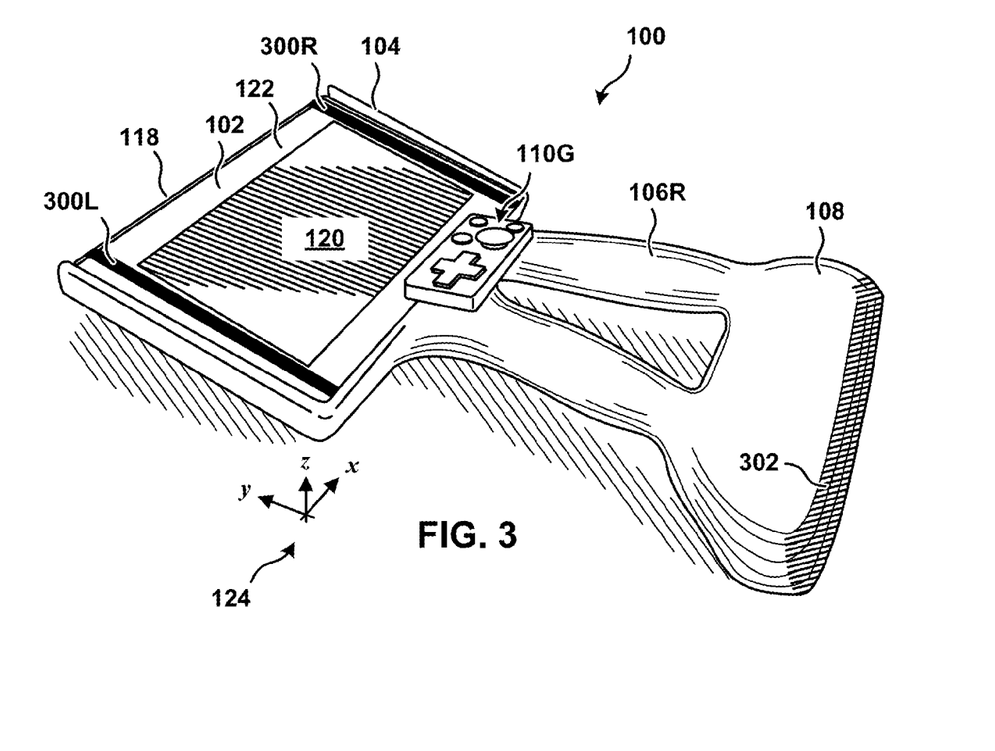
FIG. 3 is a perspective view of the portable docking station depicted in FIG. 1, with a different input device.

The dimensions of the portable docking station 100 may vary, and the concept is not limited to any particular size, weight or other dimension. As previously noted, the frame 104 may be sized to receive portable electronic devices 102 of various sizes and shapes. The handles 106 may be, for example, 10 to 20 cm long, and the width of the portable docking station 100 may likewise be 10 to 20 cm wide. The thickness of the handles 106 may be, for example, 2 to 4 cm thick, and the counterweight 108 may be 3 to 5 cm thick. As shown in FIGS. 1 and 2, the portable docking station 100 and the docked portable electronic device 102 appears substantially planar, with most components lying in the x-y plane. As shown in FIG. 3, however, when laid upon a flat surface (such as on top of the x-y plane, with reference to the coordinate system 124 in FIG. 3), the portable docking station 100 and the docked portable electronic device 102 need not be strictly planar. As discussed below, the frame 104 may tilt or rotate with respect to the handles 106. The handles 106 or counterweight 108 or both may include a bend or arch. Other embodiments may be curved or shaped in different ways.

FIG. 3 also illustrates mounting of an input device 110 that is different from the keyboard shown in FIGS. 1 and 2. In FIG. 3, the input device 110 is a game controller 110G. A user holding the portable docking station 100 as illustrated in FIG. 2 may use thumbs to press buttons, operate a joystick or use other control elements. A potential advantage of the portable docking station 100 for some game players is that the portable docking station 100 may have a feel similar to game console controllers.

FIG. 3 further illustrates an example of fasteners or securing features that secure or help hold the portable electronic device 102 in the frame 104. In FIG. 3, the securing features are in the form of elastic or stretchable straps 300L and 300R, which are physically attached to the frame 104. When the portable electronic device 102 is mounted in the frame 104, the straps 300L and 300R can be slipped or drawn over the exterior perimeter 118 of the portable electronic device 102 as shown, thereby helping retain the portable electronic device 102 securely in the frame 104. The straps 300L and 300R may include a non-slip material or may be textured or otherwise constructed so as not to slip off inadvertently during ordinary use. After slipping or drawing the straps 300L and 300R away from the exterior perimeter 118, a user can undock the portable electronic device 102 from the frame 104. Such straps 300L and 300R may be useful with portable electronic devices 102 that include an inactive area 122 because such straps 300L and 300R may obscure the inactive area 122 without obscuring the display screen 120. As previously mentioned, securing features may be of many different kinds, and the securing features shown in FIG. 3 are for purposes of illustration.

FIG. 3 also illustrates an example of padding 302 located on the proximal region of the counterweight 108. The padding 302 may be thick or thin, may be made of any material (including but not limited to a non-slip material), and may be physically coupled to the counterweight 108 in any fashion.

Figure 4:
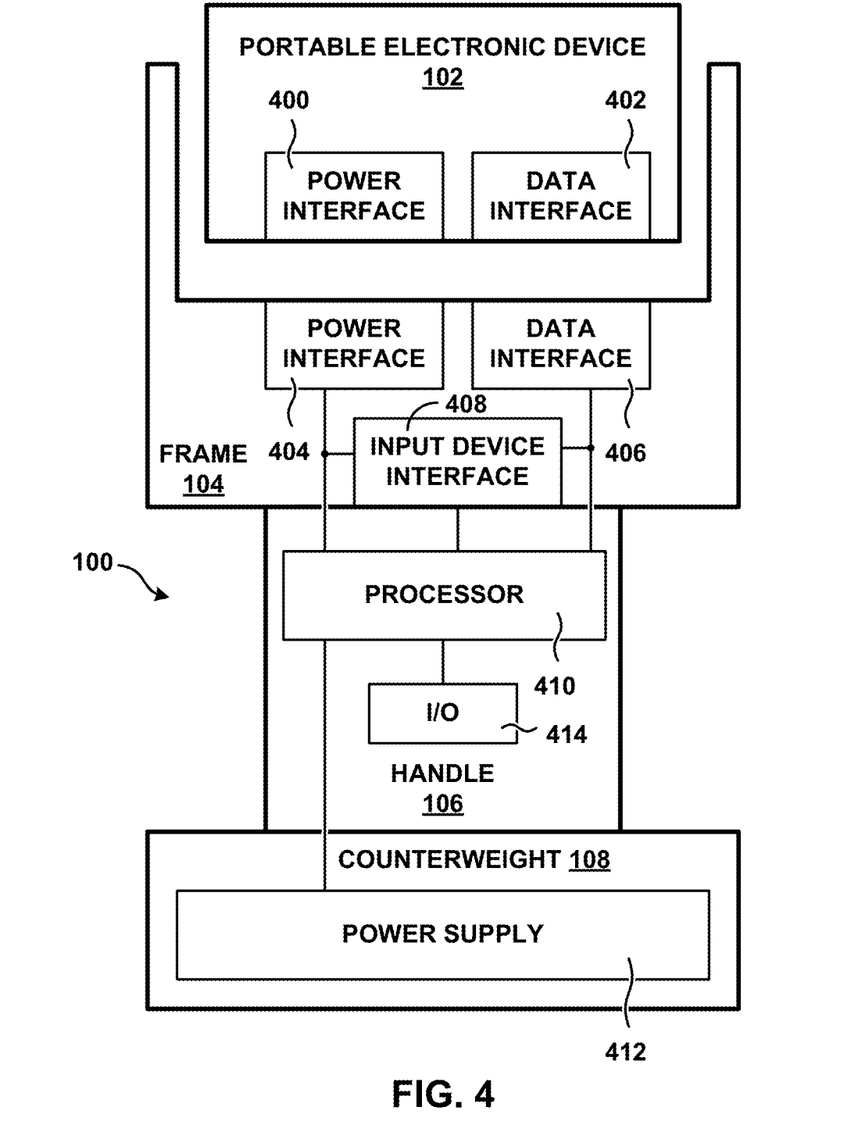
FIG. 4 is schematic diagram illustrating possible components and potential locations and interactivity of the components in a portable docking station, and interaction with a portable electronic device.

FIG. 4 is a schematic illustration of one embodiment of the concept. All embodiments need not include every component shown in FIG. 4. Further, some of the components need not be disposed or located in the particular components shown in FIG. 4.

The portable electronic device 102 may include a portable electronic device power interface 400, through which the portable electronic device 102 may receive power supplied from a source external to the portable electronic device 102. The portable electronic device 102 also includes a portable electronic device data interface 402, through which the portable electronic device 102 may receive any kind of data, such as user commands, pictures, text and machine-readable instructions. In some embodiments, the power interface 400 and the data interface 402 of the portable electronic device 102 may be combined into a single physical connector, such as a USB or micro-USB port, which may be capable of sending and receiving power and data over electrically conductive connectors in physical contact with one another. In other embodiments, the power interface 400 and the data interface 402 may be distinct components. The power interface 400 may be, for example, a conductive connector, or may be configured to receive power wirelessly such as by way of induction. In some cases, the portable electronic device 102 might not include a power interface at all (or may not include a power interface that can interact with the portable docking station 100), and may rely exclusively upon its own internal power source.

The data interface 402 may likewise be a physical interface or a wireless interface (or a combination of physical and wireless interfaces). Physical interfaces may receive signals via electrical conduction or by optical transmission, for example. Wireless interfaces may receive signals without a conductor, such as by radio or over any of several wireless protocols, such as Bluetooth™ or near-field communication.

The portable docking station 100 optionally may include a portable docking station power interface 404 that can physically mate with or wirelessly interact with or otherwise supply power to the portable electronic device 102 via the portable electronic device power interface 400. Similarly, the portable docking station 100 may include a portable docking station data interface 406 that can physically mate with or wirelessly interact with or otherwise transmit data to or receive data from the portable electronic device 102 via the portable electronic device data interface 402.

Interaction or connection between the power interfaces 404, 400 may occur automatically when the portable electronic device 102 is mounted in the frame, or may involve user action to activate an interaction or make a physical connection. Likewise, interaction or connection between the data interfaces 406, 402 may involve user action, or may be automatic.

As shown in FIG. 4, the portable docking station 100 may include an input device interface 408 that may releasably receive and hold a mounted input device 110 (not shown in FIG. 4). The input device interface 408 may include one or more fasteners or securing or aligning features, such as straps, bands, hasps, magnets, latches, and the like, that enable the input device 110 to be mounted on or removed from the input device interface 408 by a user with or without a need for tools. The input device interface 408 may further include electrical or optical contacts by which the input device 110 may receive power or transmit or receive data. In some embodiments, the input device 110 may communicate with or receive power through the input device interface 408 wirelessly. The input device interface 408 and the input device 110 physically coupled to the input device interface 408 are physically coupled to the handle 106. As shown in FIG. 4, the input device interface 408 is coupled to the handle 106 by way of an intermediate element, such as the frame 104, on which the input device interface 408 may be located. The input device interface 408 may also be located at other sites on the portable docking station 100, such as on the handle 106, and may be physically coupled to the handle 106 directly. In a variation, the input device 110 is substantially permanently mounted to the input device interface 408, and in this variation, the input device 110 is not ordinarily removable or replaceable by a user.

The input device 110 is configured to be communicatively coupled to the portable electronic device 102 by any of several paths. In one embodiment, for example, the input device 110 may be configured to communicate with the portable electronic device 102 via a separate portable docking station data interface 406. In another embodiment, signals to or from the input device 110 may be routed through or otherwise processed by the processor 410. In a further embodiment, the data interface 406 may be a component of the input device 110, and the input device 110 may be configured to communicate directly with the portable electronic device 102. When the input device 110 is communicating with the portable electronic device 102 by any communication path, the input device 110 and the portable electronic device 102 may operate in concert. For example, text typed on the input device 110 may appear on the display screen 120 of the portable electronic device 102.

The portable docking station 100 may include one or more processors 410. Although depicted in FIG. 4 as being disposed in the handle 106, the optional processor 410 may be located at other locations in the portable docking station 100. The processor 410 represents any decision-making component or controller component or data processing component, and may be but need not be a general-purpose microprocessor. Optionally, one or more volatile or non-volatile memory elements (not shown) may be communicatively coupled to the processor 410.

Some of the functions that the processor 410 may carry out include regulating delivery of electrical power from the portable docking station 100 to the portable electronic device 102 or to the input device 110 via the input device interface 408, processing data or other signals to or from the input device 110 via the input device interface 408, controlling data transmitted to the portable electronic device 102 via the data interface 406, processing data received from the portable electronic device 102 via the data interface 406, sharing data processing operations with a processor in the portable electronic device 102, controlling wired or wireless communication with a network or with devices other than the portable electronic device 102, receiving inputs via one or more control elements (such as control elements that may be on the handle 106) and executing operations in response thereto, and so on. In some embodiments, the processor 410 may be programmable.

As shown in FIG. 4, the portable docking station 100 may include a power supply 412. The power supply 412 may include one or more power components that may act individually or in concert, such as a rechargeable battery, a supercapacitor, a fuel cell system, a solar cell, and so on. The power supply 412 or some of its components may be rechargeable or user-replaceable. A charging interface (not shown) on the portable docking station 100 may receive a charger to supply electric power to the portable electronic device 102 or the portable docking station 100 or both, or to recharge rechargeable components of the power supply 412.

Power from the power supply 412 may be supplied to the portable electronic device 102 via the power interfaces 404 and 400. The power supply 412 may be configured to supply power to the portable docking station power interface 404 by way of one or more electrical conductors. The supplying of power may be under the control of the processor 410. In some implementations, the power that may be stored in the power supply 412 may augment the power that may be stored in an internal power supply (not shown) in the portable electronic device 102. Accordingly, the portable electronic device 102 may use the power supply 412 of the portable docking station 100 as a source of power that may supplement or supplant the internal power source of the portable electronic device 102. As a result, a docked portable electronic device 102 may be able to operate for a longer time than an undocked portable electronic device 102. In one variation, the portable electronic device 102 might not include an internal power source, and may rely exclusively upon power supplied by the power supply 412 in the portable docking station 100. In this variation, the overall weight of the portable docking station 100 with the docked portable electronic device 102 may be significantly reduced; the portable electronic device 102 may be lighter as a result of the absence of an internal power source, and the counterweight 108 may likewise be lighter, as balance and stability may be achieved with less mass.

Experience has demonstrated that some power supplies have non-negligible mass. Accordingly, the power supply 412 can fulfill two distinct functions at the same time, supplying power and acting as a mass of the counterweight 108. In other words, it may be advantageous to have a power supply 412 and to locate it in the counterweight 108.

The portable docking station 100 may further include an input/output device 414, by which a user may interact with the portable docking station 100. Although shown in FIG. 4 as located as part of the handle 106, the optional input/output device 414 may be located anywhere. The input/output device may be electrical, mechanical, optical, or a combination thereof, and may include one or more buttons, keys, display screens, lamps, switches, touch pads and the like. Examples of input/output devices may include: an indicator lamp (such as a light emitting diode) that notifies a user of the status of the portable docking station 100 or a component thereof (such as programmable state of the processor 410 or the level of power stored in the power supply 412); an on/off or reset switch; and one or more volume control buttons. The portable docking station 100 may further include one or more additional features, such as one or more attachment sites (such as clasps, holes, doors and sockets) for accessories (such as a stylus or headphones or laser pointer), a charging interface by which the power supply 412 can be recharged, a locking slot that can receive a cable lock or other ant-theft device, and so on. Another feature may be a built-in stand that may be recessed into a handle 106 or a counterweight 108 and by way of extendable components such as hinged elements or telescoping elements be extended, enabling the portable docking station 100 to stand substantially upright on a flat surface, without user assistance. Each of these features is optional.

When the portable electronic device 102 is docked in the portable docking station 100, the user has several options for use. The user may interact with the portable electronic device 102 directly, such as by touching the display screen 120. In such as case, the portable docking station 100 can furnish some stability such that the user touching the display screen 120 may reduce the reactive movement of the display screen 120.

Another option for use is for the user to interact with the portable docking station 100 via the input device 110. The user may choose to perform, for example, one- or two-handed thumb-based typing. The portable docking station 100 can furnish a platform by which the user may comfortably support the portable electronic device 102 while interacting with the input device 110 and at the same time the portable docking station 100 can furnish stability. Further, by interacting with the portable electronic device 102 via the input device 110 and by holding the portable electronic device 102 in a comfortable or convenient position without a need for holding or touching the exterior perimeter 118 or inactive area 122 of the portable electronic device 102, there can be a reduced risk of inadvertent touches to the display screen 120. Inadvertent touches may be an annoyance to the user, as an inadvertent touch to a touch-based display screen may result in an unintended effect or execution of an unintended command.

Figure 5:
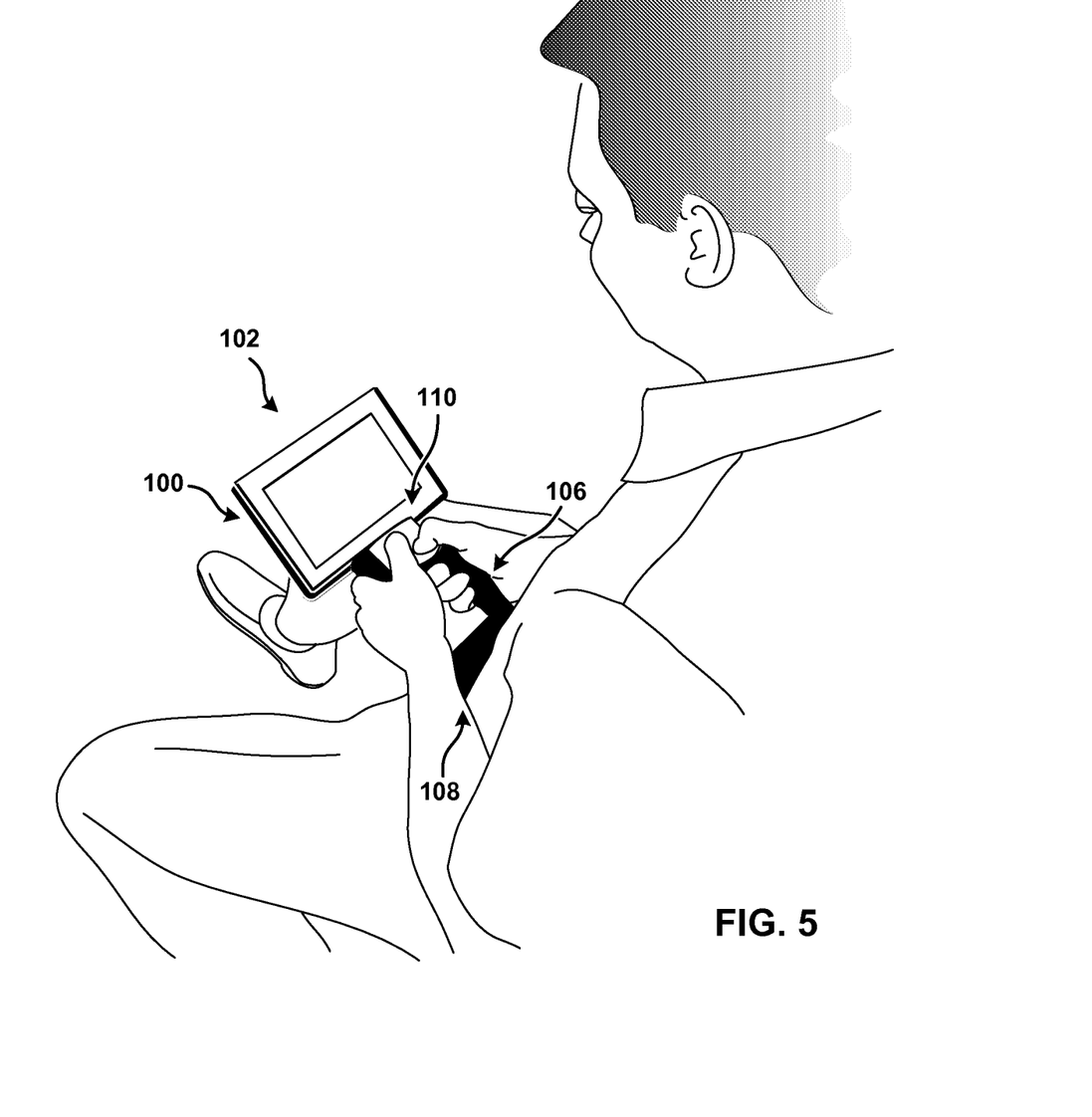
FIG. 5 is a drawing illustrating use of portable docking station with a docked portable electronic device, with a user in a sitting position.
Figure 6:
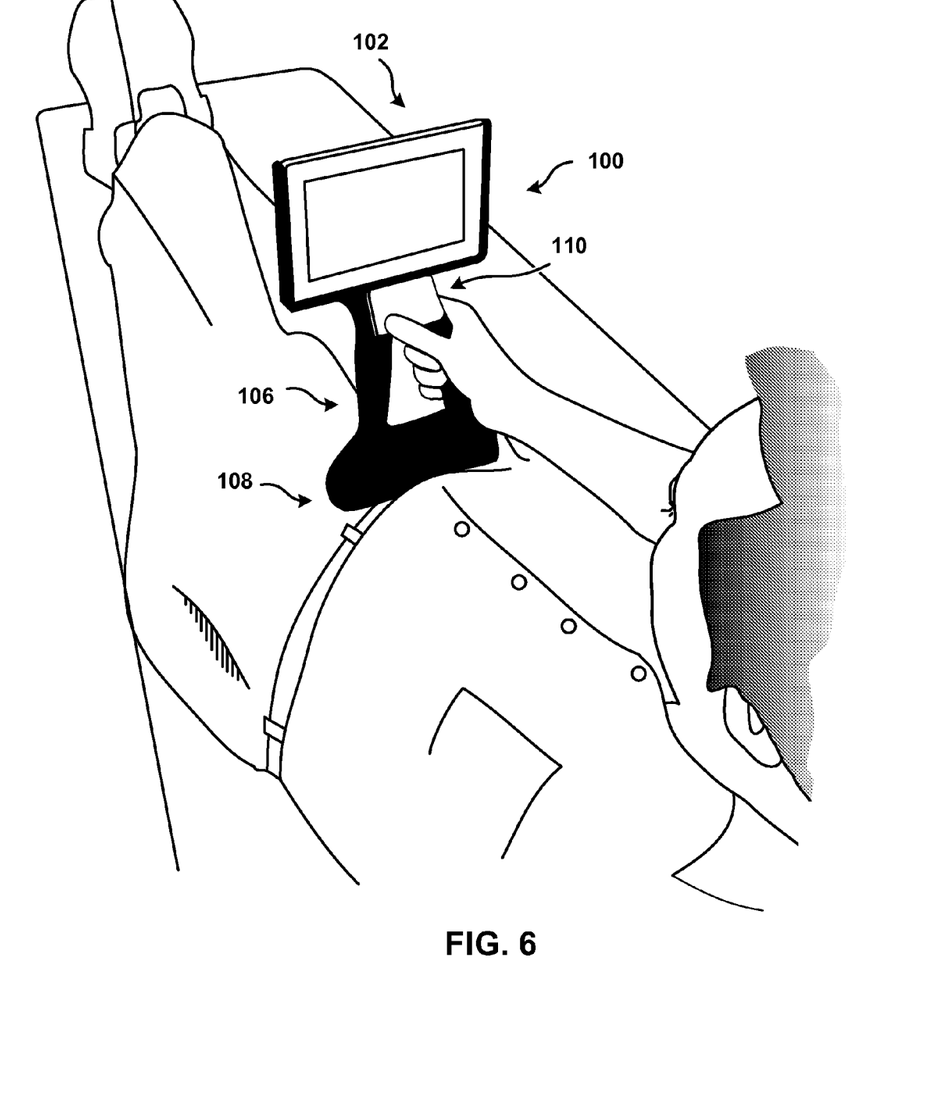
FIG. 6 is a drawing illustrating use of portable docking station with a docked portable electronic device, with a user in a reclining position.
Figure 7:
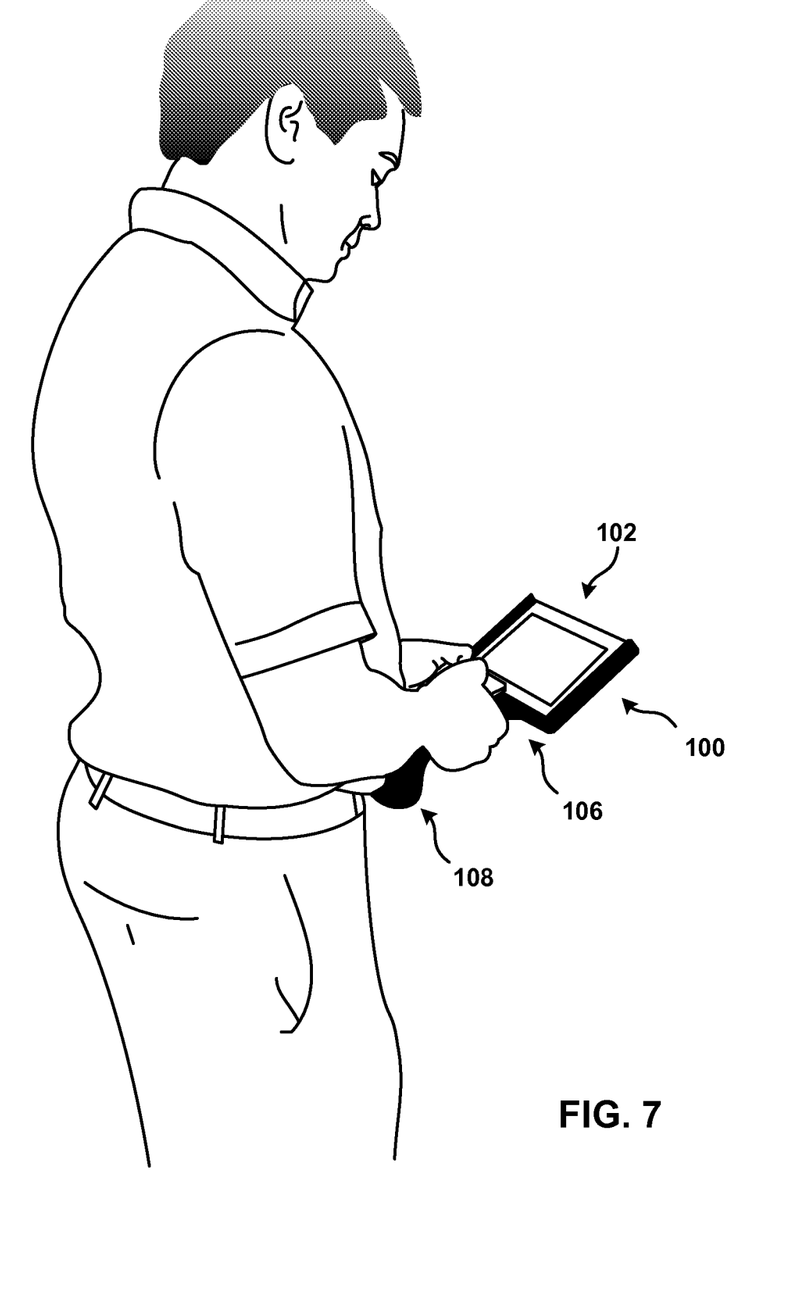
FIG. 7 is a drawing illustrating use of portable docking station with a docked portable electronic device, with a user in a standing position.

As shown in FIGS. 5, 6 and 7, the portable docking station 100 in typical usage may be in contact with a user's body, offering additional comfort, support and stability. In FIG. 5, for example, the user is depicted in a seated position. In some circumstances, such as in a waiting room, a user may be in a seated position and may not have available a table or desk upon which to rest the portable electronic device 102. In such circumstances, the user may use the portable electronic device 102, docked in the portable docking station 100, in a comfortable or convenient position. As depicted in FIG. 5, the user may interact with the portable docking station 100 and the portable electronic device 102 by holding one or more handles 106 and activating the input device 110.

As shown in FIG. 5, the user may rest the counterweight 108 against the user's midsection. Holding the portable docking station 100 in this fashion may furnish added support or stability, as the physical contact between the user's body and the counterweight 108 may make the portable docking station 100 easier to hold and less likely to move in an undesired fashion. Some users may prefer to rest the counterweight against the lap or the knees or the thighs or the stomach, for example.

FIG. 6 illustrates a user in a reclining position. The user rests the counterweight 108 on the midsection, for example, which allows the user easily to hold the portable electronic device 102, docked in the portable docking station 100, in a comfortable or convenient position. The physical contact between the counterweight 108 and the body of the user may add support and stability. As depicted in FIG. 6, the user may choose to interact with the portable docking station 100 and the portable electronic device 102 by holding a handle 106 and activating the input device 110 with a single hand. The physical contact between the counterweight 108 and the body of the user may assist with single-handed usage, by supporting the portable docking station 100 and resisting twisting.

FIG. 7 illustrates the user in a standing position. The user holds the portable docking station 100 such that the counterweight 108 physically contacts the abdomen or midsection, for example, which allows the user easily to hold the portable electronic device 102, docked in the portable docking station 100, in a comfortable or convenient position. The physical contact between the counterweight 108 and the body of the user may add support or stability or both.

As illustrated by FIGS. 5, 6 and 7, one prospective advantage of the portable docking station 100 is that it can furnish a comfortable and convenient platform for the portable electronic device 102 in a variety of circumstances, even in circumstances in which a support surface such as a desk or table is unavailable. Many portable electronic devices 102, such as tablet computers, can be inconvenient or uncomfortable to hold or to use, especially if a support surface is unavailable. The portable docking station 100, however, can increase comfort and convenience, in addition to many of the other potential benefits mentioned above.

Figure 8:
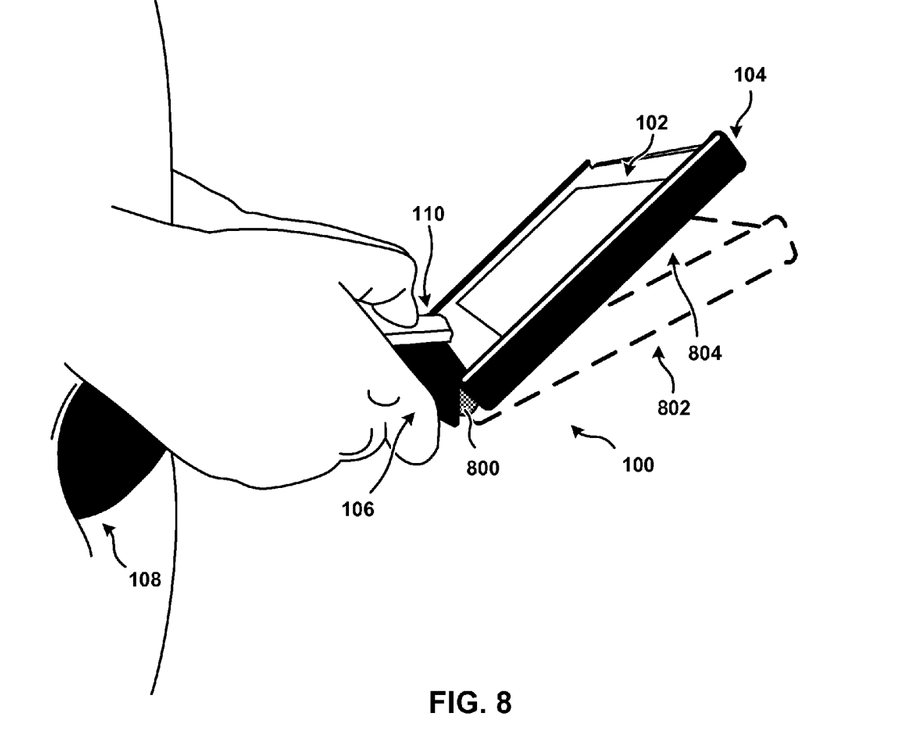
FIG. 8 is a drawing illustrating use of portable docking station with a docked portable electronic device, the portable docking station including an adjustable attaching mechanism.

FIG. 8 illustrates an optional adjustable frame 104. Although the user is shown in a standing position, the feature may be used when the user is in any position. The frame 104 is physically coupled to the handles 106 with an adjustable attaching mechanism 800, that is, the adjustable attaching mechanism 800 physically couples the frame 104 to the handles 106. The adjustable attaching mechanism 800 may include one or more adjustable structures, such as a hinge or pivot or gooseneck or articulated joint. The adjustable attaching mechanism 800 is configured to hold the frame 104 in a first position 802 (rendered in broken lines) with respect to the handles 106, and to hold the frame 104 in a second position 804 with respect to the handles 106. In other words, the adjustable attaching mechanism 800 enables the frame 104 (and the portable electronic device 102 docked in the frame 104) to be user-adjusted between different positions. A user may typically perform the adjustment without a need for tools, such as by moving the frame 104 from one position 802 to the other 804 with one hand while holding a handle 106 with the other hand. The second position 804 may be a more comfortable or more easily viewed position than the first position 802. Further, the user may adjust the position of the frame 104 without necessarily changing the way in which the counterweight 108 touches the user's body. The adjustable attaching mechanism 800 may include some stiffness or resistance to bending that when moved from the first position 802 to the second position 804, the frame 104 will tend to remain in the second position 804 during normal use. In addition or in the alternative, the adjustable attaching mechanism 800 may include stops or latches or ratchets or detents or tightening/loosening mechanisms or other physical features that may hold or lock, at least temporarily, the frame 104 in a desired position. In some embodiments, the frame 104 may be able to tilt with respect to the handles 106, as shown in FIG. 8, and in other embodiments, the frame 104 may be able to tilt or rotate or otherwise be adjustable in position. The frame 104 may have any number of possible positions, or may have a set number of positions or a limited range of position. As previously noted, some embodiments may enable the frame 104 to fold, so as to make the portable docking station 100 more compact.

The portable docking station 100 need not interfere with any other functionality of the portable electronic device 102. If the portable electronic device 102 is configured to receive or is capable of receiving telephone calls over a cellular network, for example, the portable docking station 100 may leave that functionality unaffected. In another variation, the portable docking station 100 may cooperate with the portable electronic device 102 by, for example allowing the user to answer the cellular phone call by pressing a button 114 on the input device 110. In general, the portable docking station 100 generally does not detract from the functionality of the portable electronic device 102, and may enhance that functionality.

In the preceding description, for purposes of explanation, numerous details have been set forth in order to explain many of the embodiments and variations. Such specific details are not necessarily required for every embodiment, however. Indeed, various embodiments of the portable docking station 100 may be "full featured," while other embodiments may have far fewer features. In perhaps an embodiment with the fewest features, the frame 104, handle 106 and counterweight 108 may have few or no moving parts, and few or no electronic components, with the input device 110 communicating directly with the docked portable electronic device 102 via a wired or wireless communicative coupling. Further, various features, embodiments and variations may be combined.

Implementation of one or more embodiments may realize one or more advantages, many of which have been mentioned already. Various embodiments are adaptable to a variety of portable electronic devices, a variety of user situations or postures, and a variety of uses. Although having some mass for comfort and stability, the portable docking station may be light enough for ready carrying form place to place, and may be small enough to be carried in a backpack or luggage (embodiments that can be folded or collapsed may be even more compact). Although the user may hold apparatus (a portable docking station and a docked portable electronic device) that is more massive than the portable electronic device by itself, the user may receive one or more benefits in exchange for this modest increase in weight, such as enhanced flexibility or ease of use of the portable electronic device, or enhanced functionality from the interaction between the portable docking station and the portable electronic device.

The above-described embodiments are intended to be examples only. Alterations, modifications and variations can be effected to the particular embodiments without departing from the scope of the concept, which is defined by the claims appended hereto.

What is claimed is:

1. A device comprising:
an elongated handle having a proximal end and a distal end;
a frame configured releasably to hold a portable electronic device, the frame physically coupled to the distal end of the handle;
an input device configured to be communicatively coupled to the portable electronic device and physically coupled to the handle; and
a counterweight physically coupled to the proximal end of the handle.

2. The device of claim 1, further comprising an input device interface, wherein the input device interface is configured releasably to receive and hold the input device.

3. The device of claim 1, further comprising an adjustable attaching mechanism, wherein the adjustable attaching mechanism physically couples the frame to the handle.

4. The device of claim 3, wherein the adjustable attaching mechanism is configured to hold the frame in a first position with respect to the handle, and to hold the frame in a second position with respect to the handle.

5. The device of claim 1, wherein the counterweight comprises dead weight.

6. The device of claim 1, wherein the counterweight consists of dead weight.

7. The device of claim 1, wherein the counterweight comprises a power supply.

8. The device of claim 7, further comprising a portable docking station power interface configured to supply power to the portable electronic device, wherein the power supply is configured to supply power to the portable docking station power interface.

9. The device of claim 1, wherein the counterweight comprises a proximal region, and wherein the counterweight comprises padding located on the proximal region.

10. The device of claim 1, wherein the input device comprises a game controller.

11. The device of claim 1, wherein the input device comprises a smart phone.

12. The device of claim 1, wherein the input device comprises a physical alphanumeric keyboard.

13. The device of claim 1, wherein the elongated handle comprises a first elongated handle, the device further comprising a second elongated handle having a proximal end and a distal end, wherein the frame is physically coupled to the distal end of the second handle.

* * * * *